United States Patent
Carter et al.

(10) Patent No.: US 10,130,846 B2
(45) Date of Patent: Nov. 20, 2018

(54) HYBRID ADHESION SYSTEM AND METHOD

(71) Applicant: THE CHARLES STARK DRAPER LABORATORY, INC., Cambridge, MA (US)

(72) Inventors: David J. Carter, Concord, MA (US); William W. McFarland, Waltham, MA (US); Glenn Ogrodnik, Cohasset, MA (US); Graham Arrick, Cambridge, MA (US); Maxim Bushmelov, Natick, MA (US)

(73) Assignee: THE CHARLES STARK DRAPPER LABORATORY, INC., Cambridge, MA (US)

( * ) Notice: Subject to any disclaimer, the term of this patent is extended or adjusted under 35 U.S.C. 154(b) by 7 days.

(21) Appl. No.: 15/183,266

(22) Filed: Jun. 15, 2016

(65) Prior Publication Data
US 2017/0354847 A1 Dec. 14, 2017

Related U.S. Application Data

(60) Provisional application No. 62/325,765, filed on Apr. 21, 2016.

(51) Int. Cl.
*A63B 27/00* (2006.01)
*A63B 23/035* (2006.01)
(Continued)

(52) U.S. Cl.
CPC ........ *A63B 27/00* (2013.01); *A63B 23/03541* (2013.01); *A63B 29/08* (2013.01);
(Continued)

(58) Field of Classification Search
CPC ........ A63B 27/00; A63B 27/02; A63B 27/04; A63B 21/008; A63B 22/00; A63B 23/035;
(Continued)

(56) References Cited

U.S. PATENT DOCUMENTS 1,971,850 A * 8/1934 Ernst .............. B30B 15/00
425/338
2,471,673 A * 5/1949 Cote .............. F04B 33/00
417/559
(Continued)

FOREIGN PATENT DOCUMENTS

CN 1068404 A 1/1993
DE 29606415 U1 7/1996
(Continued)

OTHER PUBLICATIONS

Machine translation of FR2921989.*
(Continued)

*Primary Examiner* — Phutthiwat Wongwian
*Assistant Examiner* — Loren Edwards
(74) *Attorney, Agent, or Firm* — Lando & Anastasi, LLP

(57) ABSTRACT

A hybrid adhesion system includes an adhesion head including at least one suction cup and a handle and a vacuum generator mechanically coupled to the adhesion head. The vacuum generator includes at least one pneumatic cylinder having an internal volume in fluid communication with the at least one suction cup and a piston having a piston rod mechanically coupled to a manual actuator.

18 Claims, 19 Drawing Sheets

(51) Int. Cl.
    *A63B 29/08*     (2006.01)
    *F16B 47/00*     (2006.01)
    *A63B 69/00*     (2006.01)
    *A63B 21/008*     (2006.01)

(52) U.S. Cl.
    CPC ........ *F16B 47/003* (2013.01); *A63B 21/0083* (2013.01); *A63B 69/0048* (2013.01); *A63B 2225/055* (2013.01)

(58) Field of Classification Search
    CPC ......... A63B 29/08; A63B 69/00; F04B 33/00; F04B 37/14
    USPC .................................. 248/363; 294/183, 188
    See application file for complete search history.

(56) References Cited

U.S. PATENT DOCUMENTS

| | | | | |
|---|---|---|---|---|
| 3,240,525 A * | 3/1966 | Wood | ................... | B25B 11/007 294/185 |
| 3,858,630 A * | 1/1975 | Cherry | ................. | B23Q 1/4804 144/144.1 |
| 4,334,839 A * | 6/1982 | Flagg | ...................... | F04B 33/00 417/536 |
| 7,240,935 B2 * | 7/2007 | Schmierer | .............. | B65G 47/91 294/189 |
| 7,887,109 B2 * | 2/2011 | Liao | ...................... | B66C 1/0212 294/187 |
| 2010/0021647 A1 * | 1/2010 | Sitti | .................... | B29C 33/3842 427/457 |
| 2014/0272272 A1 * | 9/2014 | Spenko | ..................... | C09J 9/00 428/113 |

FOREIGN PATENT DOCUMENTS

| | | | | |
|---|---|---|---|---|
| FR | 2921989 | A1 | 4/2009 | |
| FR | 2921989 | * | 5/2010 | ............. F16B 47/00 |
| JP | 6-7469 | | 1/1994 | |

OTHER PUBLICATIONS

International Search Report, corresponding PCT/US2017/027148, dated Jul. 4, 2017.

Written Opinion, corresponding PCT/US2017/027148, dated Jul. 4, 2017.

\* cited by examiner

HYBRID ADHESION SYSTEM AND METHOD

CROSS-REFERENCE TO RELATED APPLICATION

This application claims priority under 35 U.S.C. § 119(e) to U.S. Provisional Application Ser. No. 62/325,765 titled "HYBRID ADHESION SYSTEM AND METHOD," filed Apr. 21, 2016, which is incorporated herein by reference in its entirety for all purposes.

GOVERNMENT LICENSE RIGHTS

This invention was made with government support under contract number N66001-13-C-4011 awarded by United States Department of the Navy. The government has certain rights in the invention.

FIELD OF INVENTION

Aspects and embodiments disclosed herein are generally directed human powered apparatus for climbing sheer walls or other surfaces.

BACKGROUND

The gecko is known for its ability to climb smooth vertical walls and even to suspend itself inverted from smooth surfaces. This ability is derived from the presence of elastic hairs called setae that split into nanoscale structures called spatulae on the feet and toes of geckos. The abundance and proximity to the surface of these spatulae make it sufficient for van der Waals forces alone to provide the required adhesive strength for a gecko to climb smooth vertical walls. Researchers have been inspired to create apparatus to provide human operators with the ability of the gecko to climb smooth vertical walls.

SUMMARY

In accordance with an aspect disclosed herein, there is provided a hybrid adhesion system. The system comprises an adhesion head including at least one suction cup and a handle, and a vacuum generator mechanically coupled to the adhesion head. The vacuum generator includes at least one pneumatic cylinder having an internal volume in fluid communication with the at least one suction cup and a piston having a piston rod mechanically coupled to an actuator.

In some embodiments, the actuator comprises a foot pedal.

In some embodiments, the system further comprises at least one spring configured to bias the piston rod into the internal volume of the pneumatic cylinder.

In some embodiments, the system further comprises a cup plate upon which the at least one suction cup is mounted.

In some embodiments, the handle is mounted on the cup plate.

In some embodiments, the vacuum generator is hingedly coupled to the adhesion head.

In some embodiments, the piston rod is mechanically coupled to the foot pedal with one of a rope or a cable.

In some embodiments, the vacuum generator includes a plurality of pneumatic cylinders.

In some embodiments, piston rods of the plurality of pneumatic cylinders are mechanically coupled to a common piston link.

In some embodiments, the one of the rope and the cable is mechanically coupled to a loading point on the piston link.

In some embodiments, the adhesion head includes a plurality of suction cups, each of the plurality of suction cups in fluid communication with a single respective pneumatic cylinder of the plurality of pneumatic cylinders and each of the plurality of pneumatic cylinders is in fluid communication with a single suction cup of the plurality of suction cups.

In some embodiments, the plurality of suction cups are in fluid communication with the respective pneumatic cylinders via pneumatic tubes.

In some embodiments, bodies of the plurality of pneumatic cylinders are mounted to a cylinder connection plate including apertures through which piston rods of the plurality of pneumatic cylinders pass.

In some embodiments, the system further comprises at least one spring configured to bias the piston rods into internal volumes of the plurality of pneumatic cylinders, the at least one spring disposed about a spring return rod having a first end mechanically coupled to the piston link and passing through an aperture in the cylinder connection plate, the at least one spring including an end portion mechanically coupled to the cylinder connection plate.

In some embodiments, the spring is retained about the spring return rod between the cylinder connection plate and a retention nut coupled to a second end of the spring return rod.

In some embodiments, the system further comprises a tension member hingedly coupling the cylinder connection plate to the adhesion head.

In some embodiments, the at least one suction cup includes a plurality of dry adhesion microstructures disposed on an internal surface thereof.

In accordance with another aspect, a climbing system comprises a pair of hybrid adhesion systems. The hybrid adhesion systems each comprise an adhesion head including at least one suction cup and a handle, and a vacuum generator mechanically coupled to the adhesion head. The vacuum generator includes at least one pneumatic cylinder having an internal volume in fluid communication with the at least one suction cup and a piston having a piston rod mechanically coupled to an actuator.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
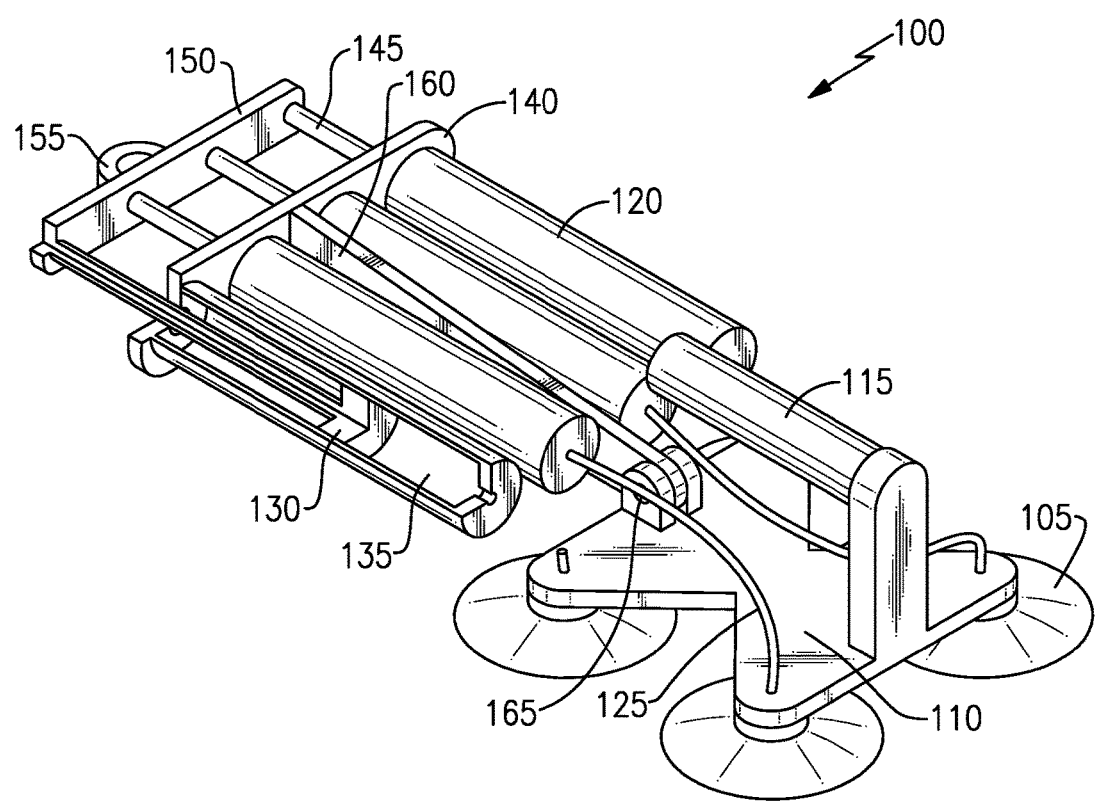
FIG. 1 is an isometric view of an embodiment of a hybrid adhesion system.

Aspects and embodiments disclosed herein are not limited in application to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Disclosed herein are systems and methods providing for humans to climb smooth walls or other structures either at an angle or vertically. Some embodiments are powered entirely by a person utilizing the system and may be silently operable due to the lack of any motor or engine. Such systems may find use in rescue operations, military scenarios, or maintenance activities performed on buildings, ships, or other structures. In some embodiments, a system for climbing a smooth wall may include portions that reversibly adhere to the wall by the application of a partial vacuum to an internal body of one or more suction cups. The vacuum may be generated by one of more pneumatic cylinders. The one or more pneumatic cylinders may include pistons that may be manually drawn out from bodies of the one or more pneumatic cylinders to create a partial vacuum that is transferred to one or more suction cups in fluid communication with internal volumes of the bodies of the one or more pneumatic cylinders. Application of the partial vacuum to internal bodies of the one or more suction cups causes the one or more suction cups to adhere to a surface, for example, a wall against which they are placed. Upon release of the pistons, the pistons retract into the bodies of the one or more pneumatic cylinders and destroy the partial vacuum, allowing the one or more suction cups to be removed from the surface to which they had adhered. Utilizing a pair of systems as disclosed herein, a user may alternately adhere and release the one or more suction cups of the pair of systems to a surface to be climbed to advance upward (or downward) on the surface. In some embodiments, friction enhancing elements including pluralities of dry adhesive nanostructures may be including in the internal bodies of the suction cups to increase the adhesion of the suction cups to surfaces. The systems may be in the form of paddles that are light weight, for example, less than 6 pounds each and able to support a person with a body weight of up to 250 pounds or more.

A first embodiment of a hybrid adhesion system is illustrated in FIG. 1, generally at 100. The system 100 includes at least one suction cup 105. The suction cup 105 may be a silicone suction cup, for example, a Piab™ F75 suction cup, although the aspects and embodiments disclosed herein are not limited to any specific type, shape, or size of suction cup. The at least one suction cup 105 is mounted to a cup plate 110. A handle 115 is mechanically coupled to the cup plate 110. Internal bodies of the suction cups 105 are in fluid communication with pneumatic cylinders 120 via tubes 125. In some embodiments, each suction cup 105 may be in fluid communication with a single pneumatic cylinder 120 and each pneumatic cylinder may be in fluid communication with a single suction cup 105. In other embodiments, a plurality of suction cups 105 may be in fluid communication with one or more pneumatic cylinders 120 or a plurality of pneumatic cylinders 120 may be in fluid communication with one or more suction cups, for example, via a manifold that may be attached to or built into cup plate 110. In further embodiments, each suction cup 105 may be in fluid communication with a plurality of pneumatic cylinders 120. A plurality of pneumatic cylinders 120 may be dedicated to a single suction cup 105. In even further embodiments, each pneumatic cylinder 120 may be in fluid communication with a plurality of suction cups. A plurality of suction cups 105 may be dedicated to a single pneumatic cylinder 120.

The pneumatic cylinders 120 include pistons 130 that, when withdrawn from within the bodies of the pneumatic cylinders 120 (See FIG. 2) create a vacuum or partial vacuum within the upper portions 135 of the bodies of the pneumatic cylinders 120 (illustrated in the partially cut-away pneumatic cylinder 120 in FIG. 1). The vacuum or partial vacuum is transferred to internal bodies of the suction cups via tubes 125 and provides a suction force providing for the suction cups 105 to adhere to a surface on which they are placed. Returning the pistons 130 to positions within the bodies of the pneumatic cylinders 120 destroys the vacuum or partial vacuum, allowing the suction cups 105 to be removed from a surface to which they were adhered.

Lower ends of the bodies of the pneumatic cylinders 120 are mounted on a cylinder connection plate 140. Piston rods 145 of the pneumatic cylinders 120 pass through apertures in the cylinder connection plate 140 and are mechanically coupled to a piston rod connection plate 150, also referred to herein as a piston link. The piston rod connection plate 150 includes a connector 155, for example, a ring or aperture at a loading point of the piston rod connection plate 150 to which a rod, rope, cable, or other force transfer element may be connected to provide for a user to displace the pistons 130 in and out of the bodies of the pneumatic cylinders 120.

Figure 2:
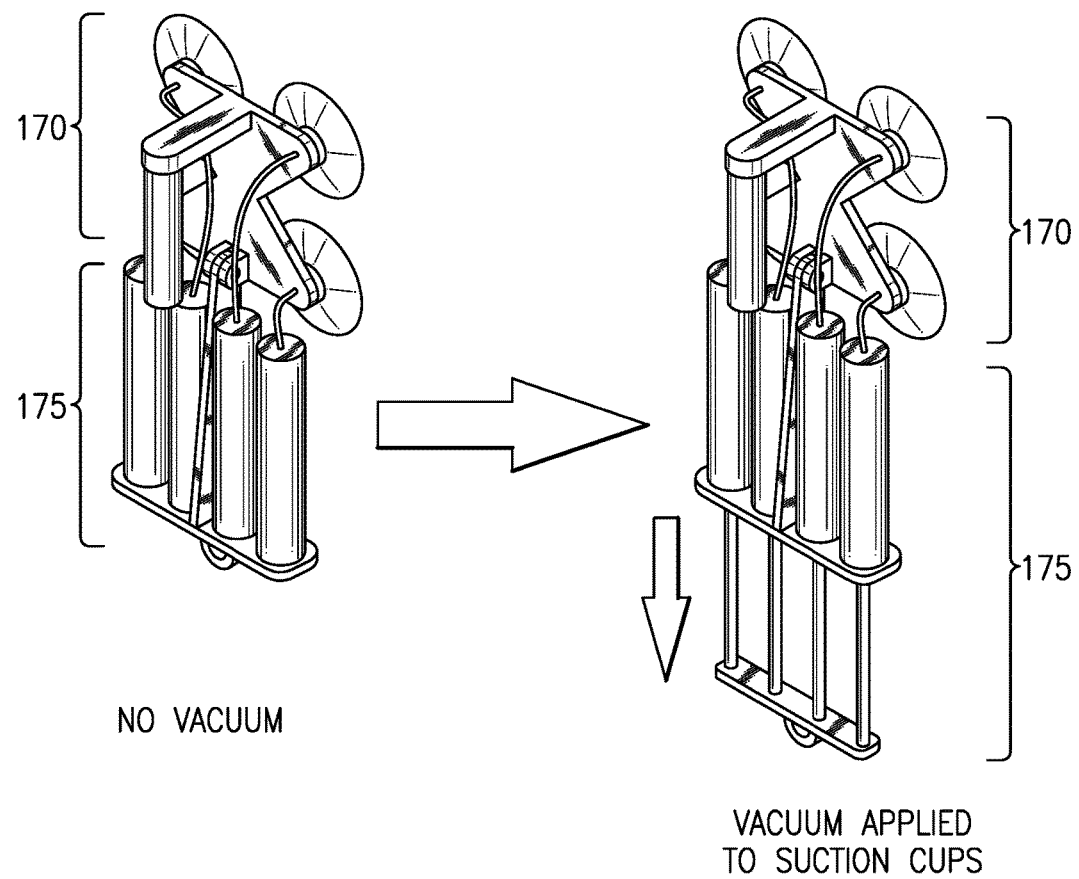
FIG. 2 is an isometric view of the hybrid adhesion system of FIG. 1 transitioning from a first state to a second state.
Figure 3:
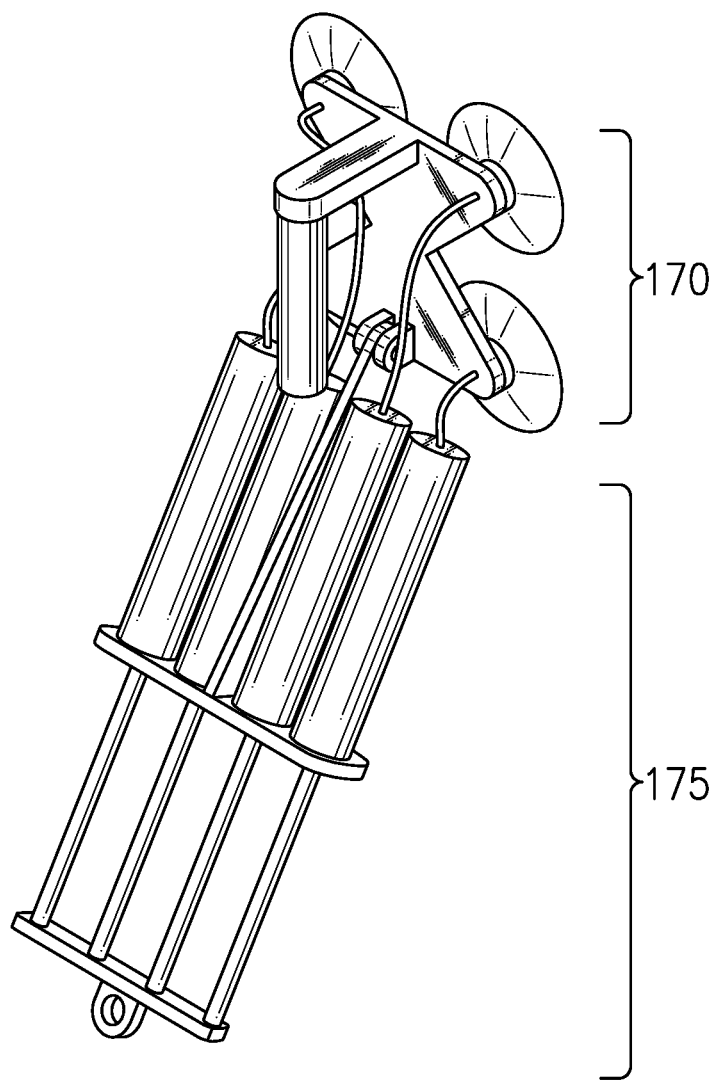
FIG. 3 is an isometric view of the hybrid adhesion system of FIG. 1 in a third state.

The portion of the system 100 including the suction cups 105, cup plate 110, and handle 115 is referred to herein as an adhesion head 170 (See FIG. 2). The portion of the system 100 including the pneumatic cylinders 120, cylinder connection plate 140, and piston rod connection plate 150 is referred to herein as a vacuum generator 175 (See FIG. 2). As illustrated in FIG. 1 and FIG. 2, the adhesion head 170 and vacuum generator 175 may be coupled together by a tension member 160 that may be mechanically coupled to the cylinder connection plate 140 and to a pivot 165 on the cup plate 110. The pivot 165 provides for the vacuum generator 175 to pivot relative to the adhesion head 170 as shown in FIG. 3. In other embodiments, the pivot 165 may provide for both pivoting and swiveling of the vacuum generator 175 relative to the adhesion head 170.

Figure 4A:
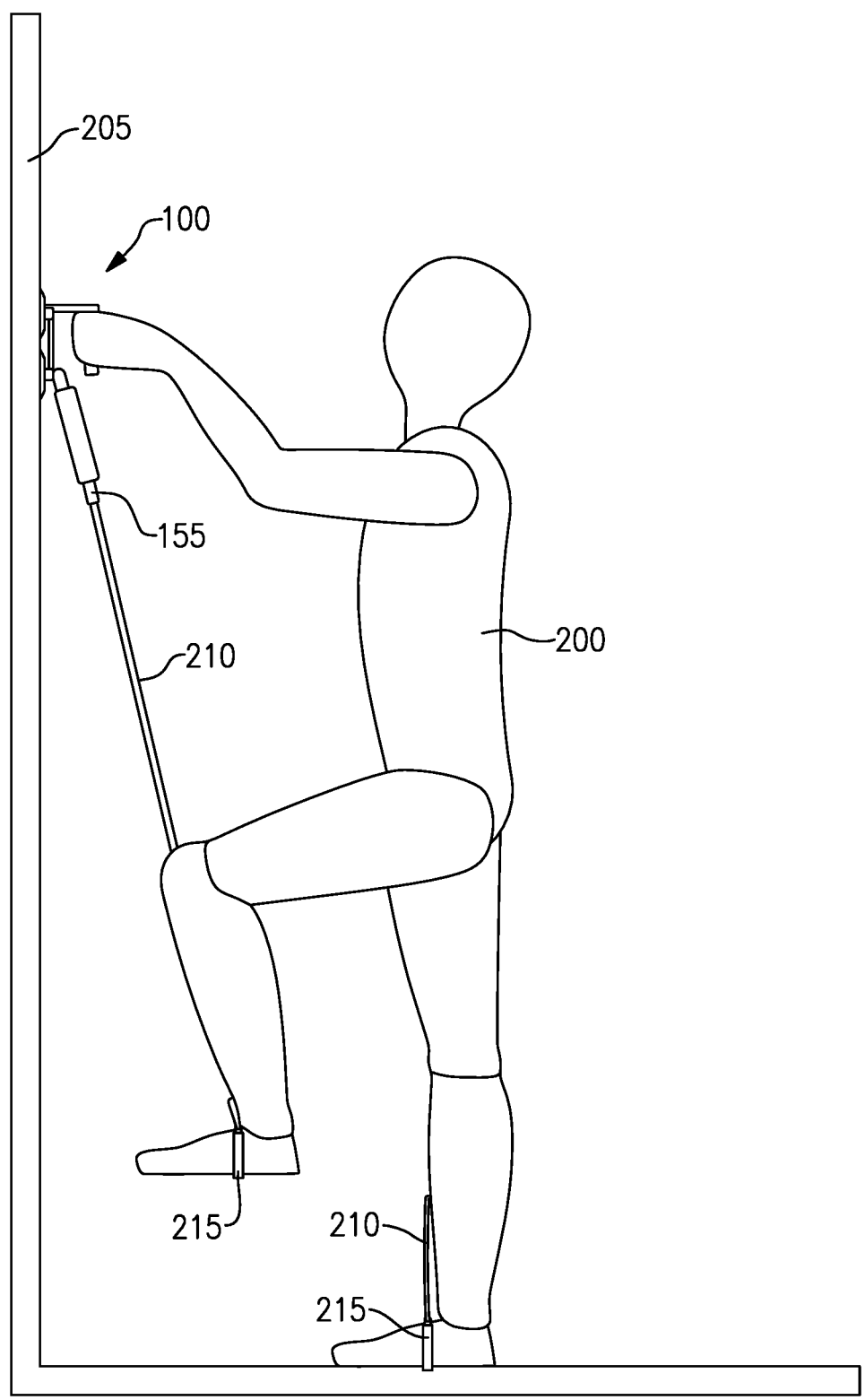
FIG. 4A illustrates an act in a method for a user to use an embodiment of a hybrid adhesion system to ascend a wall.
Figure 4B:
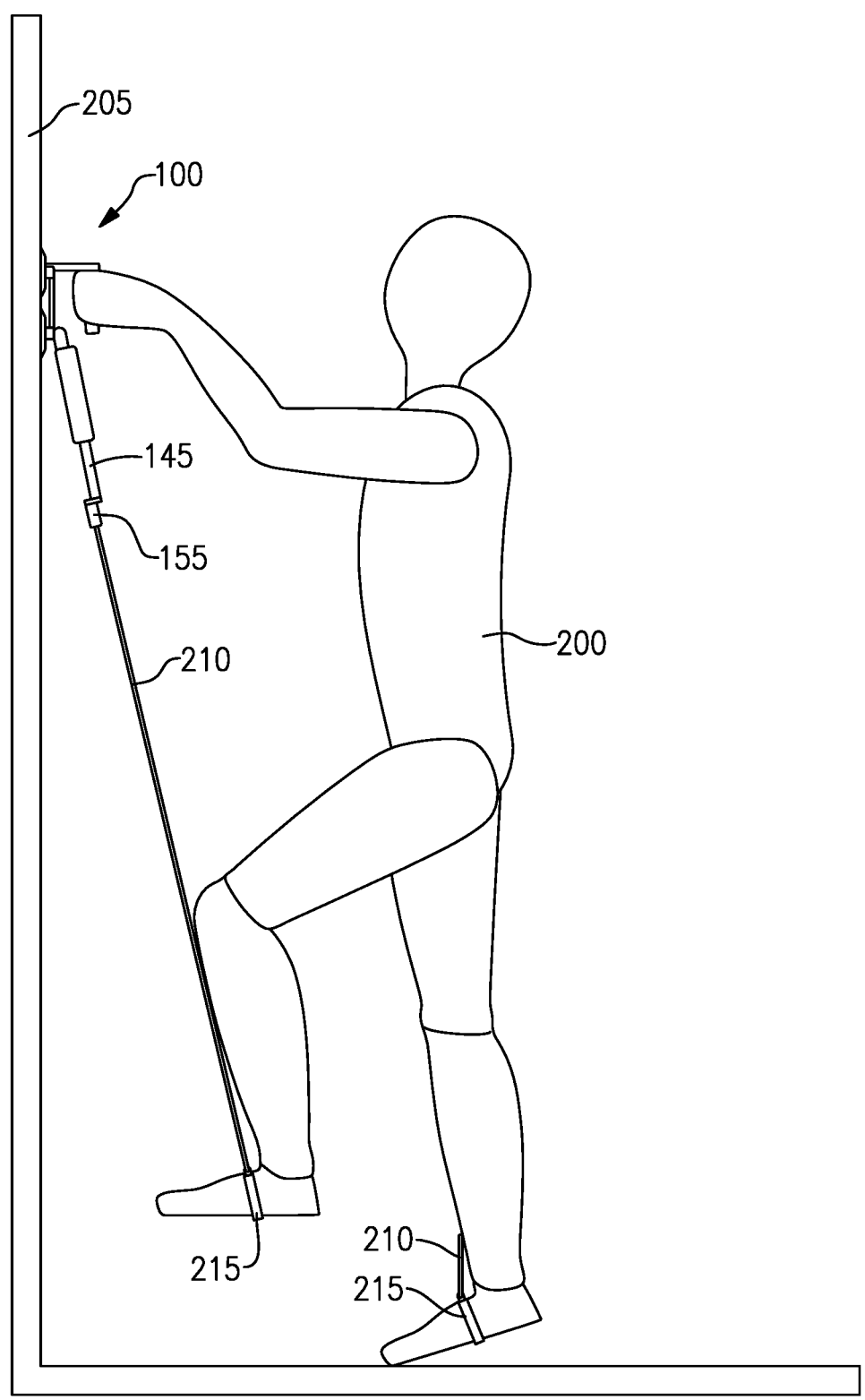
FIG. 4B illustrates another act in a method for a user to use an embodiment of a hybrid adhesion system to ascend a wall.
Figure 4C:
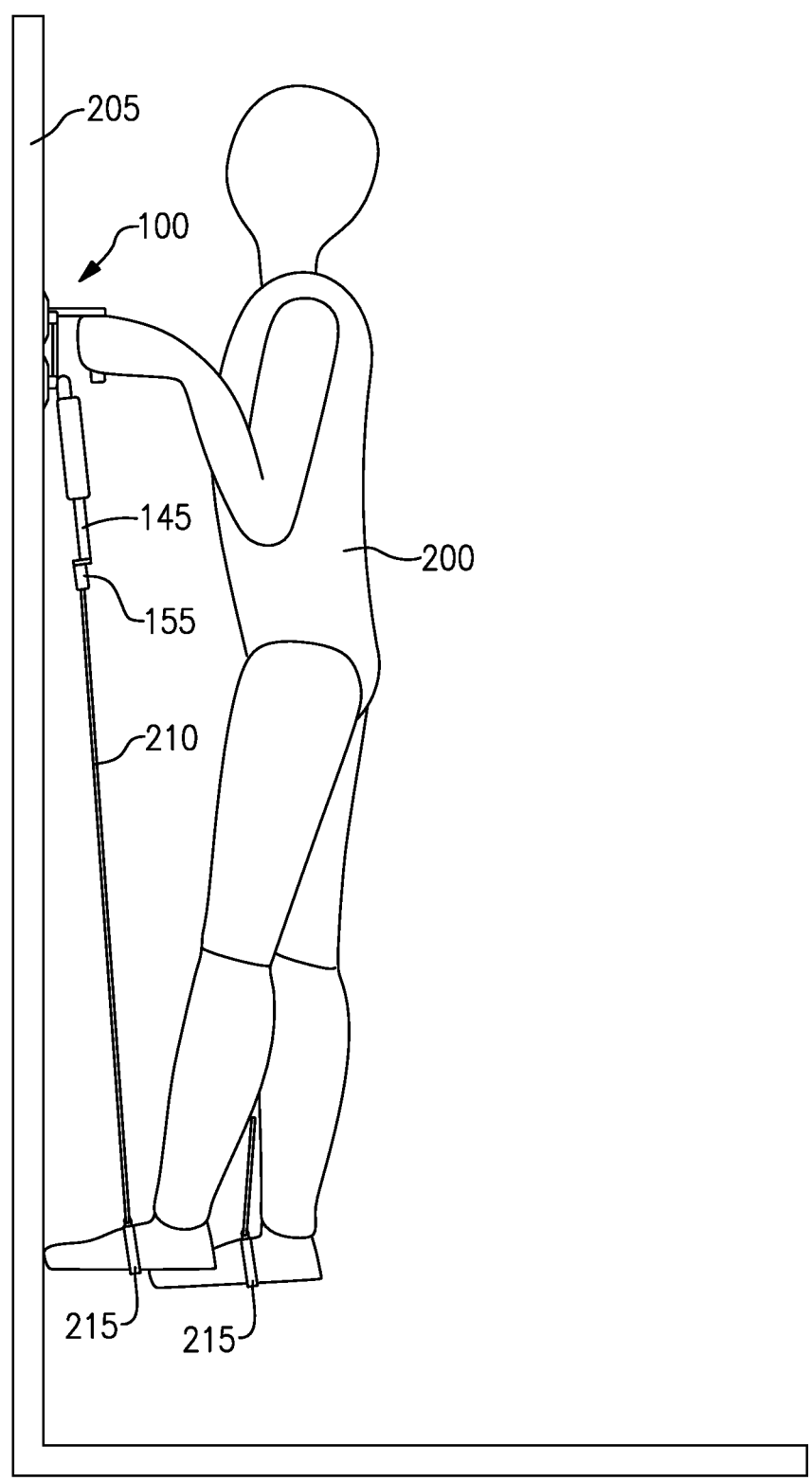
FIG. 4C illustrates another act in a method for a user to use an embodiment of a hybrid adhesion system to ascend a wall.

A method of use of the system 100 for climbing a wall is illustrated in FIGS. 4A-4C. A user 200 holds one apparatus 100 in the left hand and another (not visible in FIGS. 4A-4C) in the right hand. As illustrated in FIG. 4A, a user 200 grips the handle 115 of the apparatus 100 and applies the suction cups 105 of the apparatus 100 to the wall 205. A rod, cord, rope, or cable 210 is coupled to the connector 155 of the piston rod connection plate 150 and terminates in a user support element, for example, a foot pedal or stirrup 215. The user shifts his weight on to the foot pedal or stirrup 215 which draws the pistons 130 and piston rods 145 out of the bodies of the pneumatic cylinders 120 and creates a partial vacuum within the bodies of the suction cups 105 applied to the wall 205. The user 200 then applies his weight to the foot pedal or stirrup 215 and/or pulls on the handle 115, lifting himself up onto the wall on the foot pedal or stirrup 215 (FIG. 4B and FIG. 4C). The user repeats the process with the second apparatus 100 in the right hand and lifts himself up using the second apparatus 100 while removing his weight from the apparatus 100 in the left hand, which removes the vacuum from the suction cups 105 of the first apparatus 100 and allows the first apparatus 100 to be removed from the wall and reapplied at a higher position. This procedure is repeated and the user 200 ascends the wall 205. In some embodiments, the piston rods 145 are drawn into the bodies of the respective pneumatic cylinders 120 when the user's weight is removed from the foot pedal or stirrup 215 due to the vacuum that was generated in the bodies of the pneumatic cylinders 120.

Figure 5A:
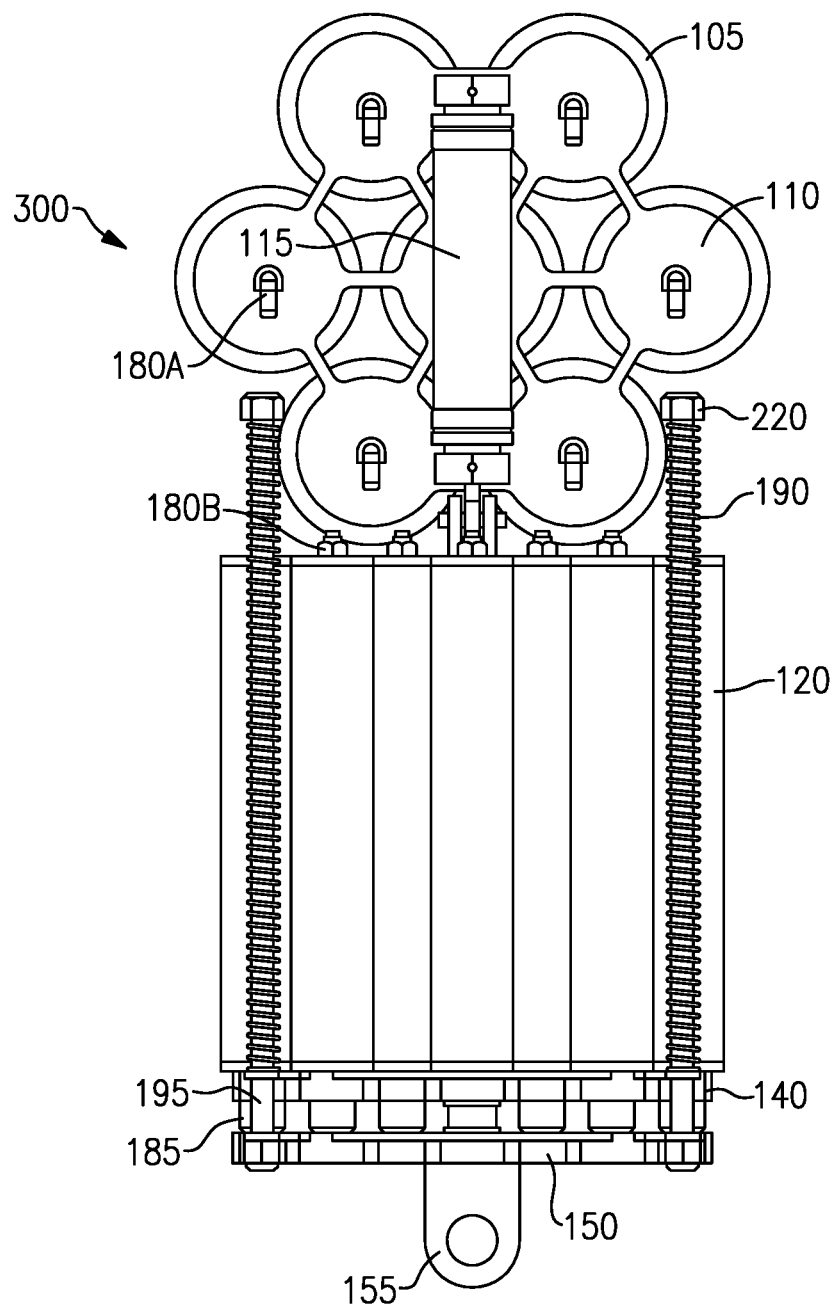
FIG. 5A is a rear elevational view of another embodiment of a hybrid adhesion system in a first state.
Figure 5B:
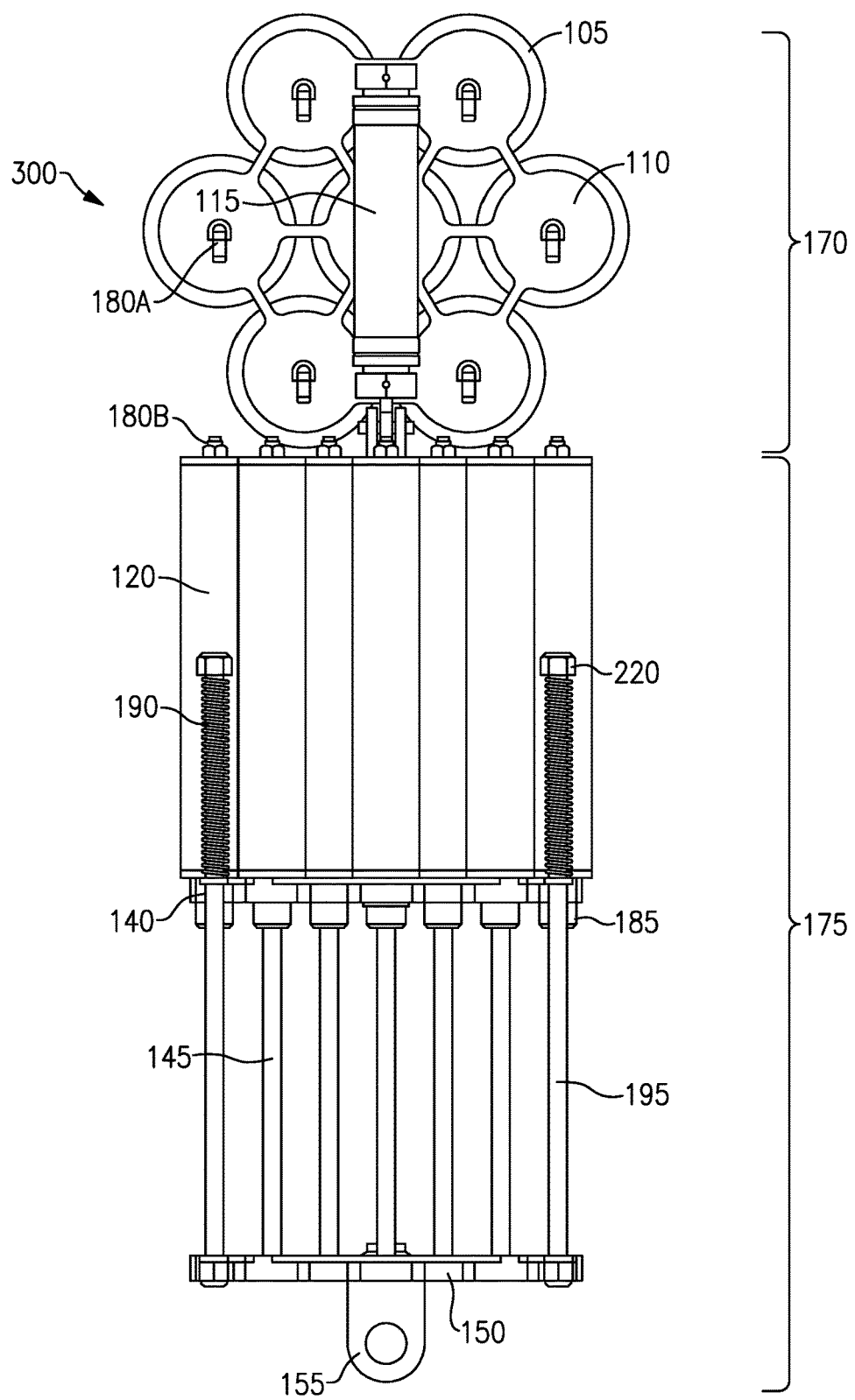
FIG. 5B is a rear elevational view of the hybrid adhesion system of FIG. 5A in a second state.
Figure 5C:
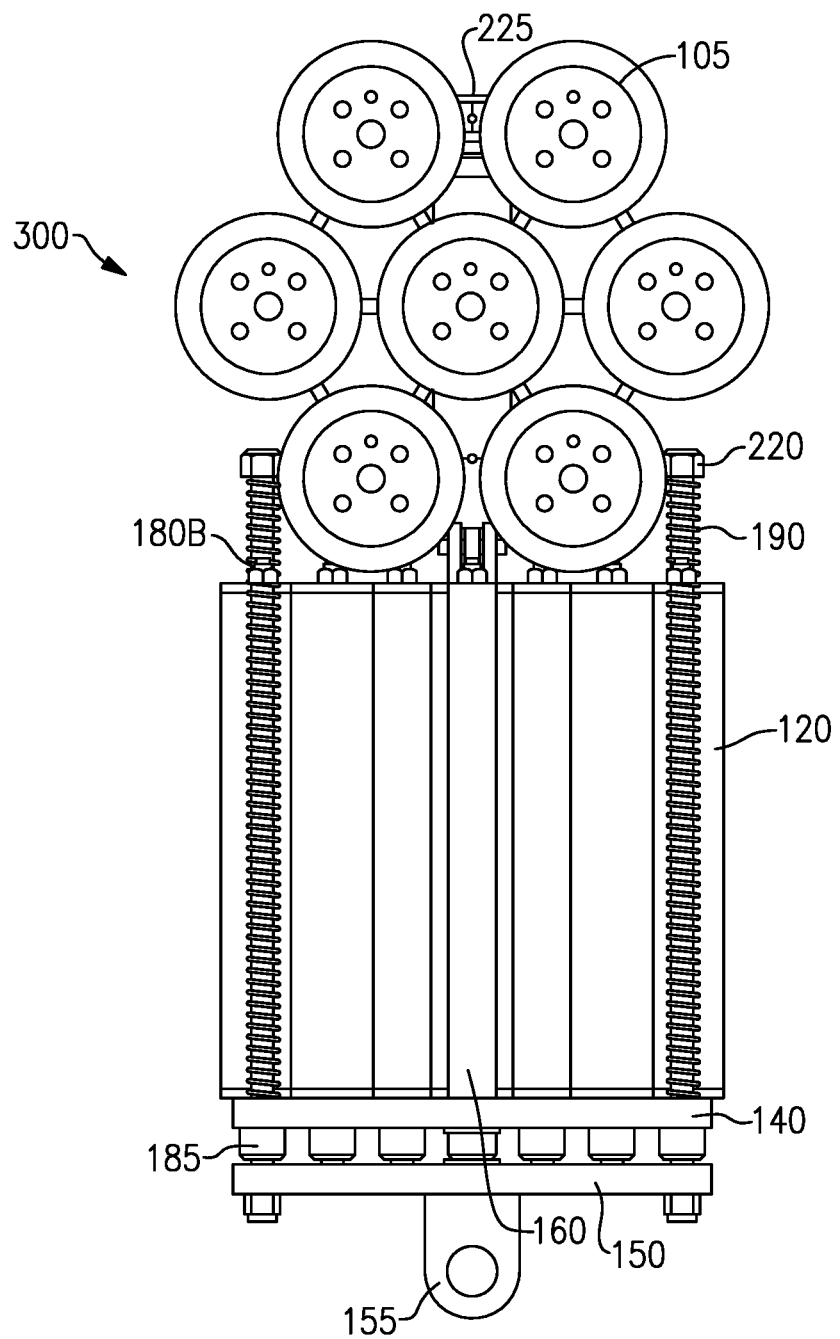
FIG. 5C is a front elevational view of the hybrid adhesion system of FIG. 5A.
Figure 5D:
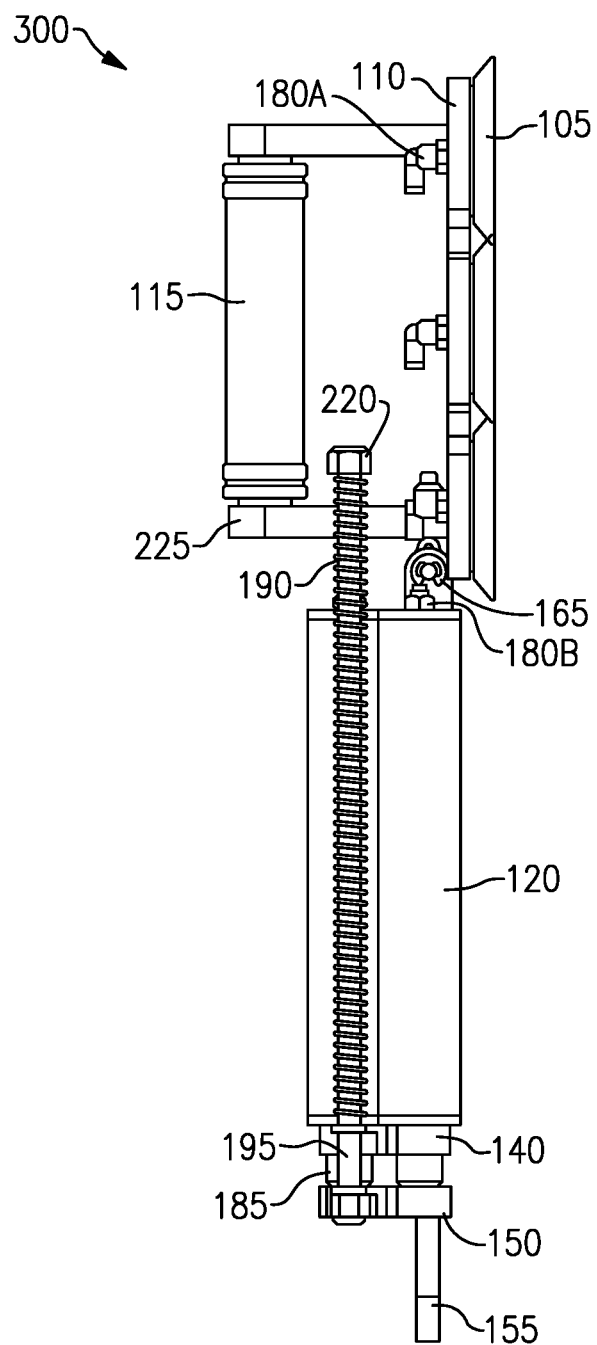
FIG. 5D is a side elevational view of the hybrid adhesion system of FIG. 5A.
Figure 5E:
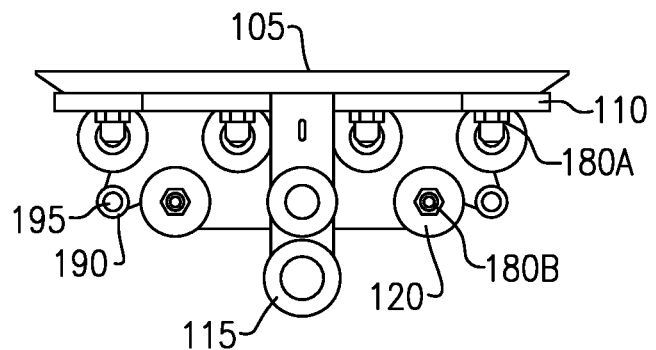
FIG. 5E is a top plan view of the hybrid adhesion system of FIG. 5A.
Figure 5F:
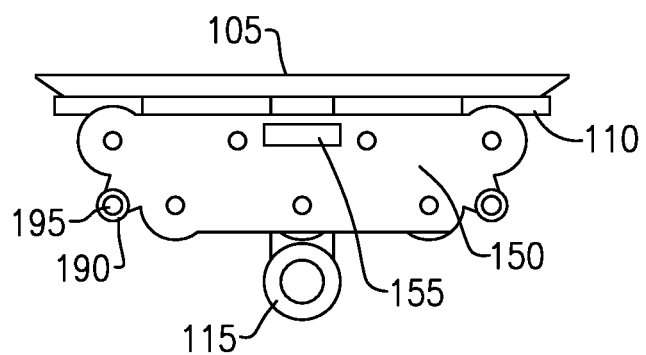
FIG. 5F is a bottom view of the hybrid adhesion system of FIG. 5A.
Figure 5G:
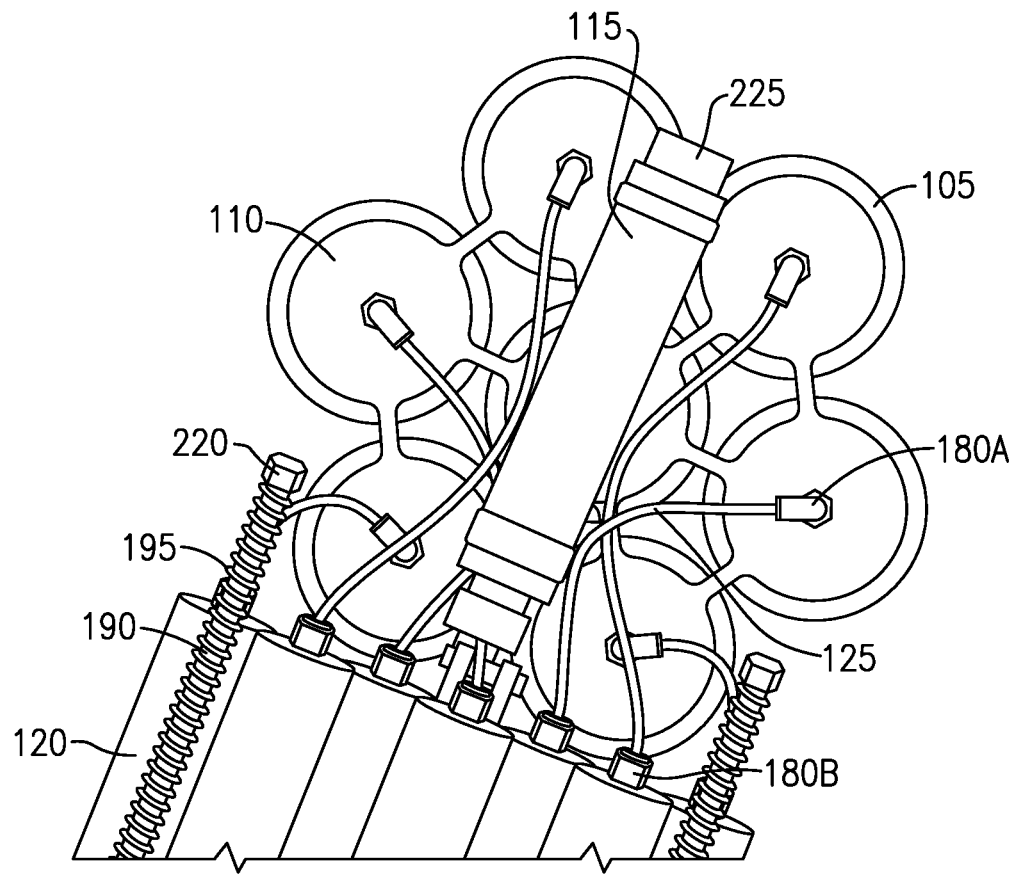
FIG. 5G is an enlarged view of the upper portion of the hybrid adhesion system of FIG. 5A.

FIGS. 5A-5G illustrate another embodiment a hybrid adhesion system 300 from the rear (the side facing a user when in use), the front (the side that adheres to a wall when in use), the side, the top, and the bottom. The same indicator numbers are used for elements of system 300 as are used for the corresponding elements of system 100 of FIGS. 1-3. As illustrated in FIGS. 5A-5G, system 300 includes seven suction cups 105 mounted on a cup plate 110. A handle 115 is also coupled to cup plate 110. System 300 includes seven pneumatic cylinders 120, each corresponding to one of the suction cups 105. Tubes 125 illustrated in FIG. 1 are not shown in FIGS. 5A-5F, but are shown in FIG. 5G. Tubes 125 provide a pneumatic connection between pneumatic couplings 180A mounted on the cup plate 110 and in pneumatic communication with the internal portions of suction cups 105 and corresponding pneumatic couplings 180B on each pneumatic cylinder 120.

Pneumatic cylinders 120 are mounted on cylinder connection plate 140. A difference between system 300 and system 100 is that the pneumatic cylinders 120 of system 300 include lower cylinder caps 185 that pass through apertures in the cylinder connection plate 140. Piston rods 145 of the pneumatic cylinders 120 pass through apertures in the cylinder connection plate 140 and are mechanically coupled to a piston rod connection plate 150 or piston link. Piston rods 145 are visible in FIG. 5B, which illustrates the piston rods 145 pulled out of the pneumatic cylinders 120 as would be performed when a user was establishing a vacuum connection between the suction cups 105 and a surface. The piston rod connection plate 150 includes a connector 155, for example, a ring or aperture at a loading point of the piston rod connection plate 150 to which a rod, rope, cable, or other force transfer element 210 may be connected and that may terminate in foot pedals or stirrups 215 as illustrated in FIGS. 2A-2C to provide for a user to displace the pistons 130 in and out of the bodies of the pneumatic cylinders 120.

In other embodiments, actuators other than or in addition to the foot pedals or stirrups 215 may be utilized to pull the piston rods 145 from the pneumatic cylinders 120. Alternate forms of actuators may be manually operated or powered. For example, foot pedals or stirrups 215 may be replaced with or augmented by a ratchet system and/or a source of pneumatic pressure, for example, a compressed air or carbon dioxide cartridge and associated pneumatic actuator(s).

Like system 100, system 300 includes a tension member 160 mechanically coupled to the cylinder connection plate 140 and to a pivot 165. In system 300 pivot 165 is indirectly mechanically coupled to the cup plate 110 by being secured to a handle mount 225 of the handle 115 proximate the cup plate 110 (See FIGS. 5C and 5D).

A feature included in system 300 that is not illustrated in system 100 in FIGS. 1-3 is a spring return mechanism that biases the piston rods 145 into the bodies of the pneumatic cylinders 120. The spring return mechanism pulls the piston rods 145 into the bodies of the pneumatic cylinders 120 (for example, to transition from the state shown in FIG. 5B to that shown in FIG. 5A) upon release of force to the rod connection plate 150 and/or connector 155 coupled to the rod connection plate 150 and maintains the piston rods 145 within the bodies of the pneumatic cylinders 120 in the absence of force applied to the rod connection plate 150 and/or connector 155. The spring return mechanism includes springs 190 that are disposed about spring return rods 195 between the cylinder connection plate 140 and retaining nuts 220 coupled to the tops of the spring return rods 195. The spring return rods 195 pass through apertures in the cylinder connection plate 140 and, as illustrated in FIG. 5B, are drawn though the cylinder connection plate 140 along with the piston rods 145 when a downward force is applied to the rod connection plate 150 and/or connector 155. When the lower portions of the spring return rods 195 are drawn through the cylinder connection plate 140 the springs 190 become compressed between the cylinder connection plate 140 and the retaining nuts 220 and provide a force biasing the piston rods 145 back into the bodies of the pneumatic cylinders 120. System 300 is illustrated as including two spring return mechanisms, one behind and proximate the left side of the array of pneumatic cylinders 120 and another behind and proximate the right side of the array of pneumatic cylinders 120, however, it should be appreciated that in other embodiments a different number of spring return mechanisms and/or spring return mechanisms located in alternate positions may be utilized.

Figure 6:
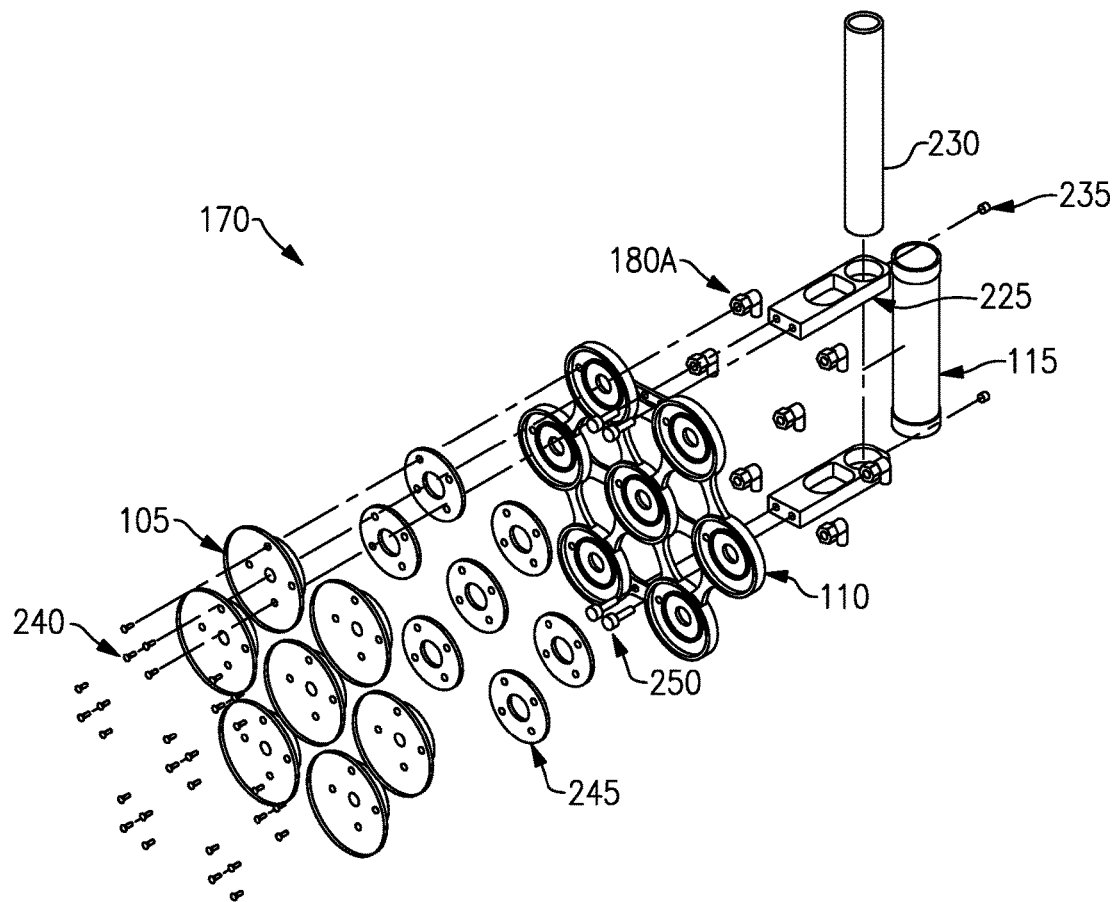
FIG. 6 is an exploded view of the upper portion of the hybrid adhesion system of FIG. 5A.

FIG. 6 is an exploded view of the adhesion head 170 of system 300. As shown in FIG. 6, suction cups 105 are mounted onto the front of cup plate 110 via suction cup mounting inserts 245 and fasteners 240. Fasteners 240 may be screws, (e.g., flat head screws), bolts, pins, or other fasteners known in the art. Pneumatic couplings 180A are mounted to the rear of cup plate 110 and include portions passing through cup plate 110 to provide pneumatic connections with internal volumes of the suction cups 105. Upper and lower potions of handle mount 225 are secured to the rear of the cup plate via fasteners 250 that pass through the cup plate 110. Fasteners 250 may be screws, (e.g., flat head screws), bolts, pins, or other fasteners known in the art. The handle 115 includes a handle grip mounted about a handle tube 230 that passes through apertures in the upper and lower potions of handle mount 225 and that is secured to the upper and lower potions of handle mount 225 via fasteners 235. Fasteners 235 may be screws, (e.g., set screws), bolts, pins, or other fasteners known in the art. It is to be appreciated that FIG. 6 illustrates only one embodiment for connecting the portions of the adhesion head 170. In other embodiments, one or more of the portions of the adhesion head may be formed integral with other portions or may be connected by other methods, for example, by adhesives and/or by welding.

Figure 7:
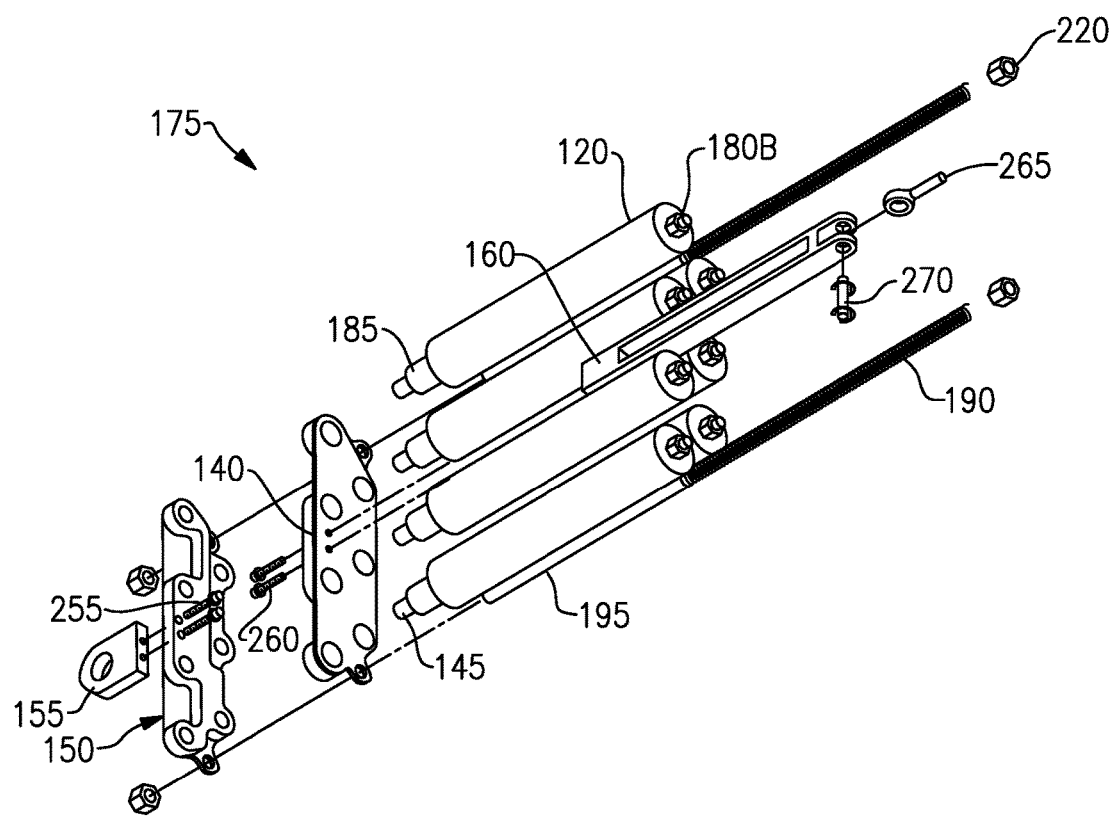
FIG. 7 is an exploded view of the lower portion of the hybrid adhesion system of FIG. 5A.

FIG. 7 is an exploded view of the vacuum generator 175 of system 300. As illustrated in FIG. 7 the tension member 160 that couples the adhesion head 170 and vacuum generator 175 is provided within the array of pneumatic cylinders 120. A rod end fastener 265 that form a portion of pivot 165 and that has an upper end that connects to the lower portion of the handle mount 225 as illustrated in FIG. 5C is coupled to the upper end of the tension member via a fastener 270, for example, a pin with associated retaining rings. The lower end of the tension member is secured to the cylinder connection plate 140 via fasteners 260, for example, screws or bolts that pass through the cylinder connection plate 140 and into the lower body of the tension member. The connector 155 is secured to the rod connection plate 150 via fasteners 255, for example, screws or bolts that pass through the rod connection plate 150 and into the body of the connector 155. It is to be appreciated that FIG. 7 illustrates only one embodiment for connecting the portions of the vacuum generator 175. In other embodiments, one or more of the portions of the vacuum generator 175 may be formed integral with other portions or may be connected by other methods, for example, by adhesives and/or by welding.

Figure 8:
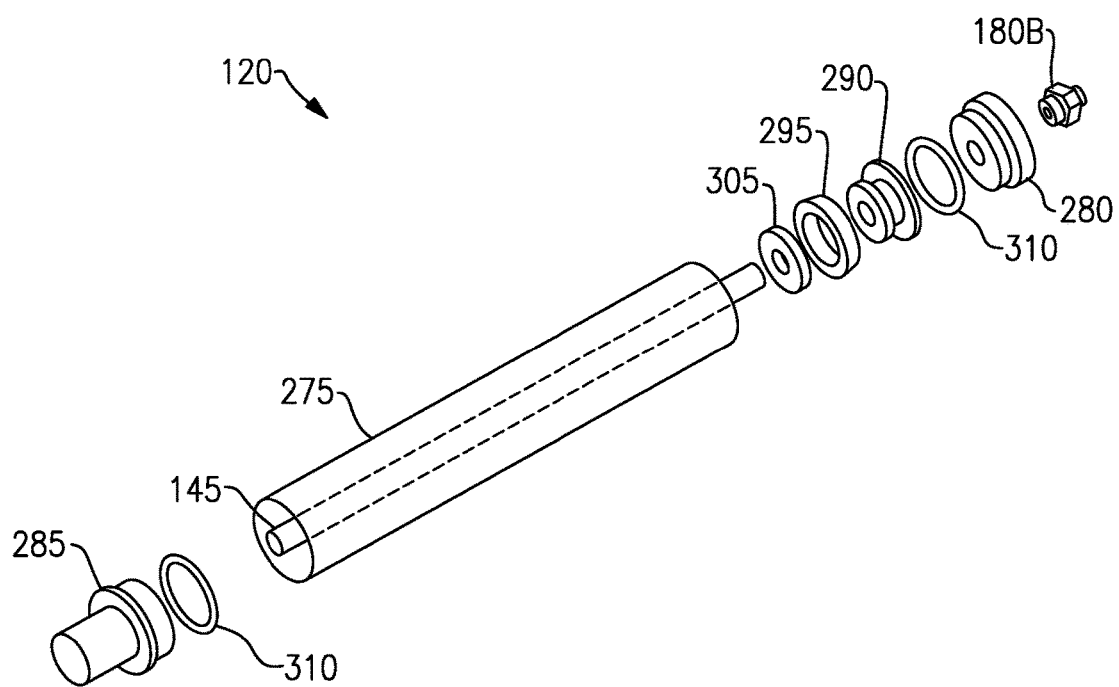
FIG. 8 is an exploded view of a pneumatic cylinder of the hybrid adhesion system of FIG. 5A.

Details of one embodiment of a pneumatic cylinder 120 for use in embodiments of the hybrid adhesion system disclosed herein is illustrated in exploded view in FIG. 8. The pneumatic cylinder 120 includes a body 275 through which the piston rod 145 reciprocates into and out of. An upper cap 280 and a lower cap 285 seal the body 275 of the piston 120 while allowing the piston rod 145 to pass through an aperture in the lower cap. O-rings 310 may provide an air-tight seal between upper cap 280 and lower cap 285 and the internal surface of the body 275. Piston rod 145 has a piston head 290 mounted on an upper end within the body 275. A piston seal 295 may provide an air-tight seal between the piston head 290 and the internal surface of the body 275. Piston stop 305 may soften any impact between the piston head 290 and the lower cap 285. Pneumatic coupling 180B is disposed on upper cap 280 and provides a connection point for a tube 125 which pneumatically couples the interior portion of the body 275 above the piston head 290 to an internal volume of a suction cup 105.

Figure 9A:
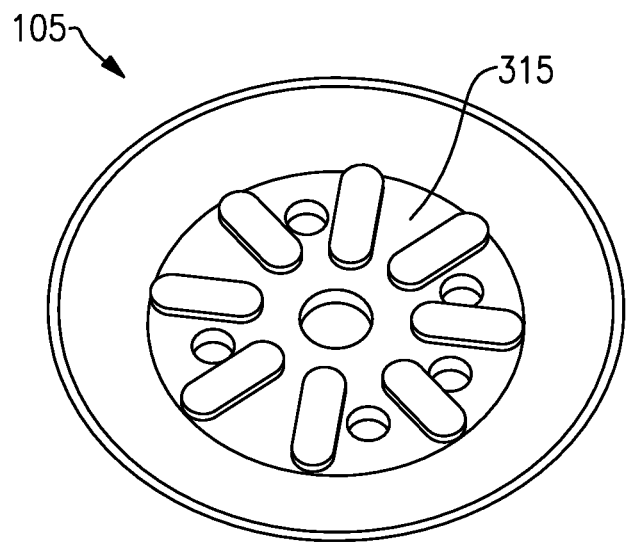
FIG. 9A illustrates an embodiment of a suction cup for the hybrid adhesion system.
Figure 9B:
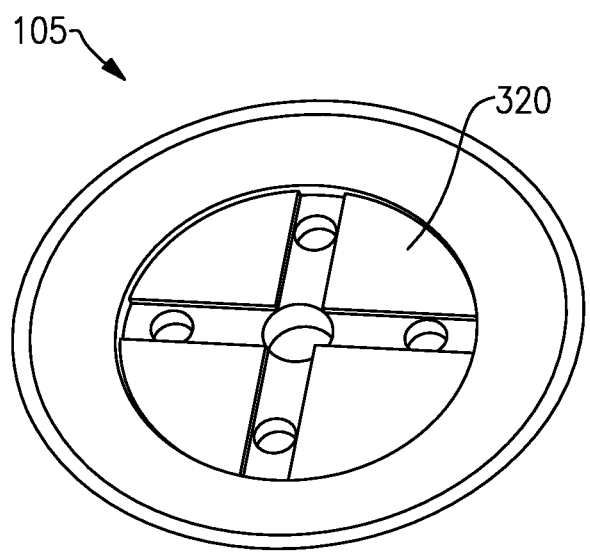
FIG. 9B illustrates another embodiment of a suction cup for the hybrid adhesion system.

In some embodiments, one or more of the suction cups 105 of embodiments of the hybrid adhesion system disclosed herein may include one or more friction enhancing elements. The one or more friction enhancing elements may be disposed on internal front surfaces 315 of the suction cups 105 and may contact a surface to which the suction cups are adhered. The friction enhancing elements may increase the load until failure of the suction cups 105 in shear (in a direction parallel to a surface to which the suction cup is adhered) and/or normal to a surface to which the suction cup is adhered. FIG. 9A illustrates an embodiment of a suction cup 105 without a friction enhancing element on its internal front surface 315. FIG. 9B illustrates an embodiment of a suction cup 105 with a friction enhancing element 320 on its internal front surface 315.

Figure 10:
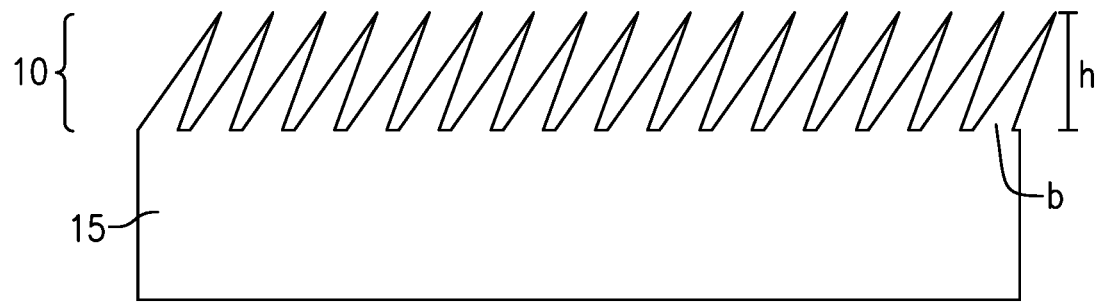
FIG. 10 illustrates an embodiment of a dry adhesive microstructure that may be included in suction cups of a hybrid adhesion system.
Figure 11:
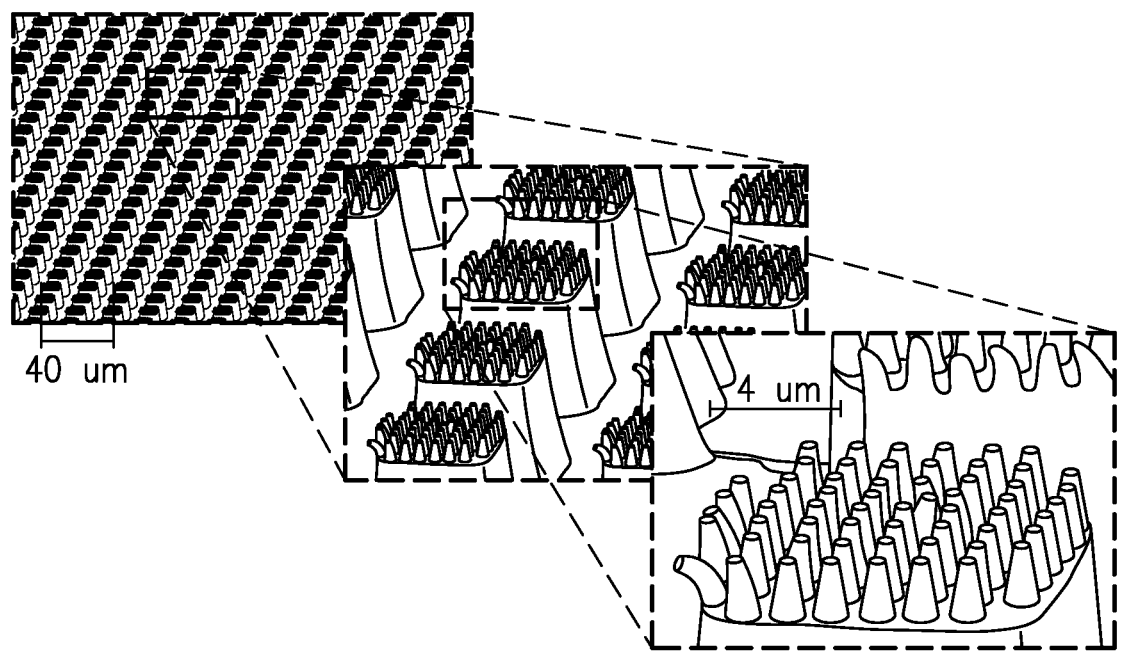
FIG. 11 illustrates another embodiment of a dry adhesive microstructure that may be included in suction cups of a hybrid adhesion system.

The friction enhancing elements 320 may include an array of dry adhesive microstructures. The dry adhesive microstructures may comprise or consist of a polymeric material, for example, silicone or polyurethane. The dry adhesive microstructures may be in the form of an array of microwedges as illustrated in FIG. 10 and as described in, for example, co-pending PCT application No. PCT/US2015/064795 (attached as an appendix herewith) or U.S. Patent Publication No. 2012/0295068. As described in PCT application No. PCT/US2015/064795 the microwedge array may include a body 15 on which are formed a plurality of microwedges 10 that may have heights h of between about 80 µm and about 120 µm and bases b with widths of between about 20 µm and about 40 µm. In other embodiments, the dry adhesive microstructures may be in the form of arrays of micropillars, for example, as illustrated in FIG. 11, in the form of hierarchical structures that include ~1 µm tall posts on top of larger ~8 µm tall pillars. In some embodiments just the smaller posts or just the larger pillars of the micropillars illustrated in FIG. 11 may be utilized for the dry adhesive microstructures. It is to be understood that the present disclosure is not limited to dry adhesive microstructures including the microwedges of FIG. 10 or the micropillars of FIG. 11. In alternate embodiments, other micro/nanostructured surfaces may be utilized as dry adhesive microstructures in the friction enhancing elements 320.

In some embodiments, the friction enhancing elements 320 are formed separately from the remainder of the suction cups 105 and joined to the internal front surfaces 315 of the suction cups 105 with, for example, an adhesive. In other embodiments the friction enhancing elements 320 are formed integral with the remainder of the suction cups 105, for example, by molding the friction enhancing elements 320 on the internal front surfaces 315 of the suction cups 105 during manufacturing of the suction cups 105.

Figure 12:
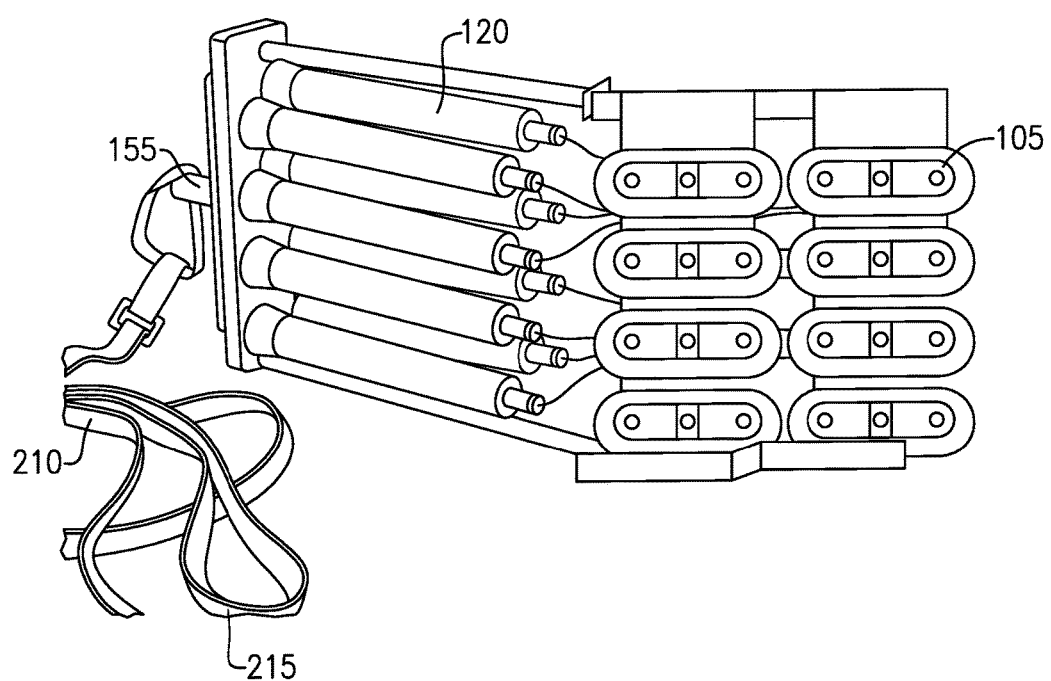
FIG. 12 illustrates another embodiment of a hybrid adhesion system.

It should be appreciated that various modifications may be made to the embodiments of the hybrid adhesion system disclosed herein. For example, the shape, number, and arrangement of suction cups may be modified from the embodiments disclosed above. FIG. 12 illustrates an alternate embodiment including eight oval shaped suction cups 105 arranged in two parallel rows, with associated pneumatic cylinders 120.

Aspects and embodiments of the hybrid adhesion system disclosed herein have been described for use for climbing sheer surfaces. The hybrid adhesion systems disclosed herein, however are not limited to use for climbing. In some instances hybrid adhesion systems as disclosed herein may be used for other purposes involving the desire to provide adhesion to sheer surfaces. For example, hybrid adhesion systems as disclosed herein may be used for the handling of glass sheets or metal plates.

EXAMPLE

Figure 13A:
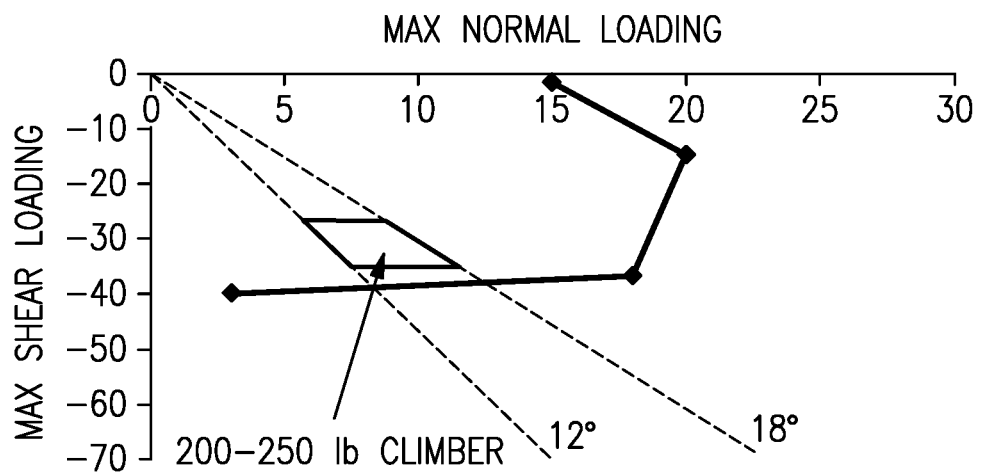
FIG. 13A is a chart of a first set of test results of another embodiment of a hybrid adhesion system.
Figure 13B:
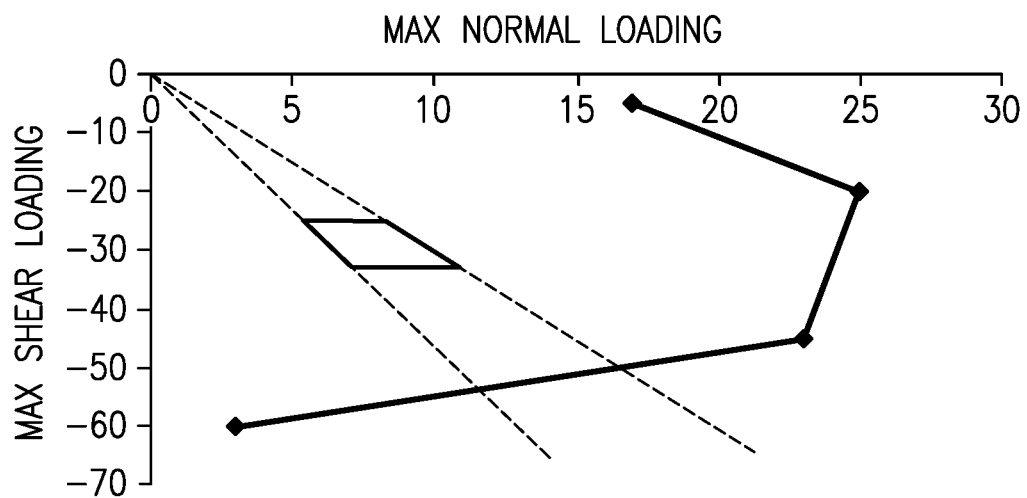
FIG. 13B is a chart of a second set of test results of another embodiment of a hybrid adhesion system.

The increase in shear and normal loading for suction cups 105 including friction enhancing elements 320 in the form of the microwedges illustrated in FIG. 10 are demonstrated by the data in FIGS. 13A and 13B. The charts in FIGS. 13A and 13B represent the results of testing of loading to failure at various load angles of Piab™ F75 suction cups on dry glass without the friction enhancing elements 320 (FIG. 13A) and with the friction enhancing elements 320 (FIG. 13B). As can be seen from a comparison between FIGS. 13A and 13B, the addition of the friction enhancing elements 320 to the suction cups increased the maximum normal loading from about 20 pounds to about 25 pounds, and increased the maximum shear loading from about 40 pounds to about 60 pounds, a 1.5× improvement.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A hybrid adhesion system comprising:
    an adhesion head including a plurality of suction cups mounted on a common cup plate, each of the plurality of suction cups including a plurality of dry adhesion microstructures disposed on an internal surface thereof; and
    a vacuum generator including a plurality of pneumatic cylinders arranged in side-by-side relationships, each of the plurality of pneumatic cylinders having an internal volume in fluid communication with a respective one of the plurality of suction cups, each of the plurality of pneumatic cylinders having a piston having a piston rod mechanically coupled to an actuator, the vacuum generator being hingedly coupled to the adhesion head via a pivot having an axis of rotation parallel to a plane defined by front surfaces of the plurality of suction cups, each of the plurality of suction cups in fluid communication with a single respective pneumatic cylinder of the plurality of pneumatic cylinders and each of the plurality of pneumatic cylinders is in fluid communication with a single suction cup of the plurality of suction cups, bodies of the plurality of pneumatic cylinders being mounted to a cylinder connection plate including a plurality of apertures through which each piston rod of the plurality of pneumatic cylinders pass, each piston rod of the plurality of pneumatic cylinders passing through a different one of the plurality of apertures; and
    at least one spring configured to bias the piston rod of each of the plurality of pneumatic cylinders into internal volumes of the plurality of pneumatic cylinders, the at least one spring being disposed about a spring return rod distinct from each piston rod of the plurality of pneumatic cylinders and having a first end mechanically coupled to a piston link to which an end of each piston rod opposite an end of each piston rod including a piston head is mechanically coupled, the end of each piston rod opposite the end of each piston rod including the piston head and the first end of the spring return rod being mechanically coupled to the piston link at the piston link, the spring return rod passing through an aperture in the cylinder connection plate, the at least one spring including an end mechanically engaging a surface of the cylinder connection plate.

2. The system of claim 1, wherein the actuator comprises a stirrup.

3. The system of claim 2, configured to be powered entirely by a person utilizing the system, the system lacking any motor or engine.

4. The system of claim 1, further comprising a handle mounted on the cup plate.

5. The system of claim 1, wherein the plurality of suction cups are in fluid communication with the respective pneumatic cylinders via pneumatic tubes.

6. The system of claim 1, wherein the spring is retained about the spring return rod between the cylinder connection plate and a retention nut coupled to a second end of the spring return rod, a second end of the spring mechanically engaging a surface of the retention nut facing toward the cylinder connection plate.

7. The system of claim 1, further comprising a tension member coupling the cylinder connection plate to the adhesion head, the tension member extending between the cylinder connection plate and the pivot and having an end portion coupled to the cylinder connection plate at a surface of the cylinder connection plate and a second end portion forming a portion of the pivot.

8. A climbing system comprising a pair of the systems of claim 1.

9. The system of claim 1, wherein an entirety of the spring return rod is disposed external to the plurality of pneumatic cylinders.

10. The system of claim 1, wherein the plurality of dry adhesion microstructures includes an array of microwedges.

11. The system of claim 10, wherein microwedges in the array of microwedges have heights of between 80 µm and 120 µm and bases with widths of between 20 µm and 40 µm.

12. The system of claim 1, wherein the plurality of dry adhesion microstructures includes an array of micropillars.

13. The system of claim 1, wherein the pivot includes a portion disposed on one of the cup plate or a handle mount that secures the handle to the cup plate.

14. The system of claim 1, wherein each piston rod is mechanically coupled to the actuator with a mechanical force transfer element including one of a rope or a cable extending between a loading point disposed on the piston link and the actuator.

15. The system of claim 1, wherein the pivot provides for both pivoting and swiveling of the vacuum generator relative to the adhesion head.

16. The system of claim 1, wherein the plurality of suction cups are coupled to the common cup plate by fasteners passing through each of the plurality of suction cups.

17. The system of claim 1, further comprising a separate mounting insert disposed between each of the plurality of suction cups and the common cup plate.

18. The system of claim 1, wherein each of the plurality of pneumatic cylinders includes a lower cylinder cap that passes through an aperture in the cylinder connection plate.

* * * * *

UNITED STATES PATENT AND TRADEMARK OFFICE
CERTIFICATE OF CORRECTION

Page 1 of 1

PATENT NO. : 10,130,846 B2
APPLICATION NO. : 15/183266
DATED : November 20, 2018
INVENTOR(S) : David J. Carter et al.

It is certified that error appears in the above-identified patent and that said Letters Patent is hereby corrected as shown below:

On the Title Page

(73) Assignee: delete "THE CHARLES STARK DRAPPER LABORATORY, INC., Cambridge, MA (US)" and insert -- THE CHARLES STARK DRAPER LABORATORY, INC., Cambridge, MA (US) --

Signed and Sealed this
Eleventh Day of June, 2019

Andrei Iancu
*Director of the United States Patent and Trademark Office*